United States Patent Office 3,213,265
Patented Oct. 19, 1965

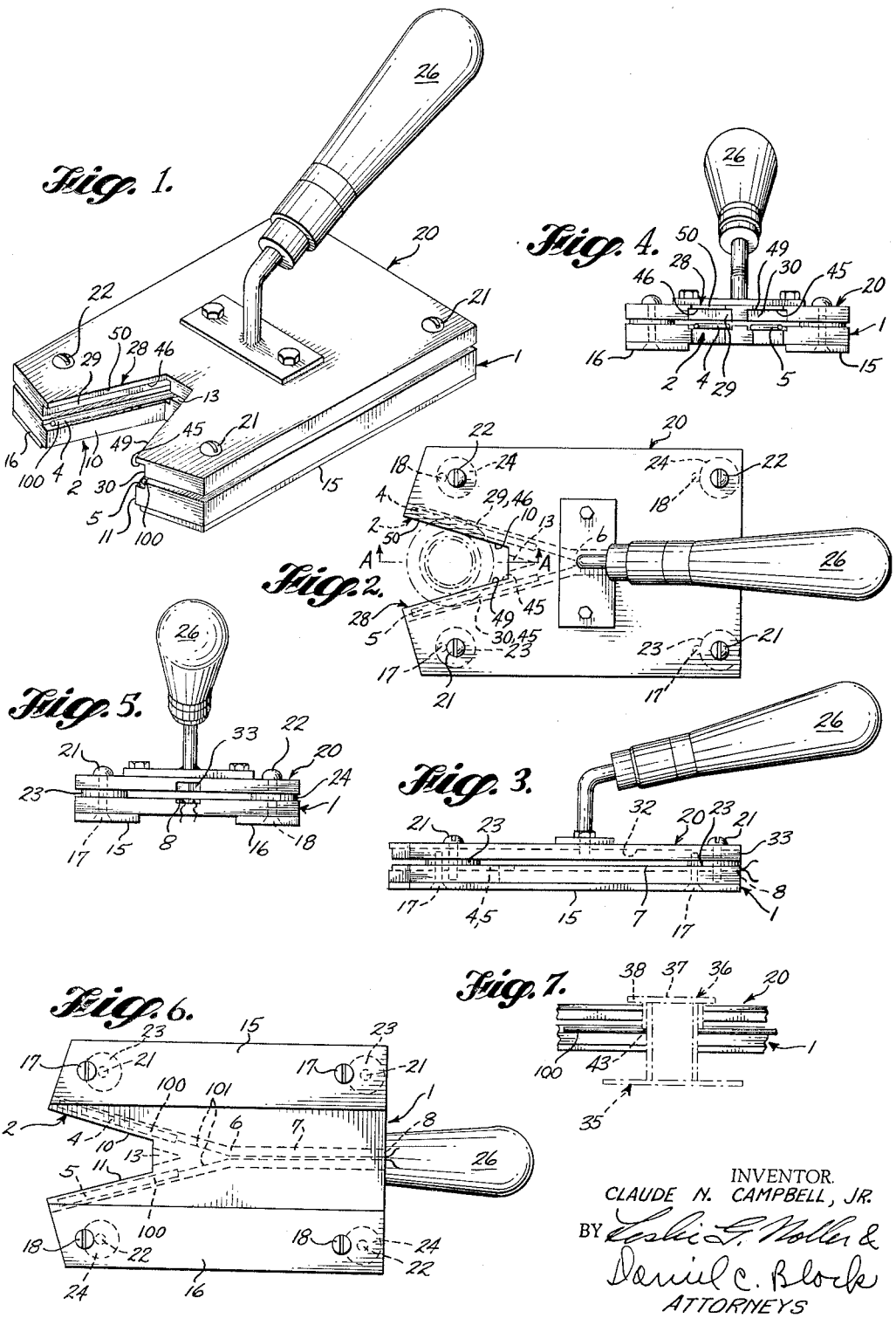

3,213,265
DEVICE FOR HEAT SECURING MEMBERS TOGETHER
Claude N. Campbell, Jr., Edgewater Park, N.J., assignor to Weyerhaeuser Company, Tacoma, Wash., a corporation of Washington
Filed Sept. 26, 1963, Ser. No. 311,886
1 Claim. (Cl. 219—229)

This invention pertains to the securement of members or portions together by the application of heat, particularly platsic members or portions and especially those of generally cylindrical form placed in either abutting or telescopic relation to each other, the invention covering a device for effecting such attachment.

An object of the invention is to provide a device for securing members or portions, especially plastic members or portions, together by the application of heat which device secures the members or portions together substantially simultaneously on opposite sides thereof without the necessity of any adjustment or manipulation of relatively movable parts of the device.

Another object of the invention is to provide a device not only as above indicated but which will also accommodate different sizes of members or portions for the securement thereof together.

Another object of the invention is to provide a device as above indicated which is unitary with no parts relatively movable to each other and therefore tamperproof and especially durable and dependable.

A further object is to provide a device as indicated above which is extremely simple in construction, inexpensive to make, especially quick and easy to use, and always dependable in use and, moreover, which requires little or no care or skill and is foolproof in use.

Other objects, features, and advantages of the invention will appear upon proceeding with the following description of an illustrative preferred form of the invention, read in conjunction with the accompanying drawing, in which:

FIGURE 1 is a perspective view with parts omitted for clarity, of a device for heat securing thermoplastic members together, the device constituting or embodying said illustrative form of the invention;

FIGURE 2 is a top plan view of the device of FIGURE 1 with plastic members being heat secured together being shown in phantom lines;

FIGURE 3 is a side elevational view of the device;

FIGURES 4 and 5 are front and rear elevational views of the device, respectively;

FIGURE 6 is a bottom plan view of the same; and

FIGURE 7 is a fragmentary view taken along lines A—A and in the direction of the arrows in FIGURE 2 showing the plastic members in position while being heat secured together.

Referring to the drawing figures in detail, reference numeral 1 generally designates a single, flat non-heat conductive member of any suitable material having a generally V-shaped notch 2 extending inwardly from the front thereof and positioned centrally in the transverse or lateral direction. This notch is also symmetrical along the longitudinal center line of the member. The member 1 is relieved or stepped back along each side of the V-notch at 4 and 5, which reliefs extend rearwardly and join at 6 to continue rearwardly therefrom as a single relief or groove 7 opening to the outside of the member at the rear thereof at 8.

Electric heating means 100 (see FIGURE 6) such as resistance wires or coils are positioned within the member 1 extending along the sides 10 and 11 of the V-notch in the member and below the reliefs or steps 4 and 5 thereof. An electric cord 101 (see FIGURE 6) extends from rearwardly of the member 1 into the opening at 8 and along the groove 7, passing into the member 1 on each side of the raised triangular portion 13 thereof and being connected to the heating means 100 for energizing the same. The cord 101 also passes through a relief or groove in the member above member 1 as will be covered later, as well as in the space between the two members.

Strips 15 and 16 of non-heat conductive or insulation material of any suitable type are secured to the bottom of the member 1 along the opposite longitudinal edges thereof by means of screws 17 and 18 for permitting the device of the invention to be set down on a surface without danger of burning or scorching the surface when the device is hot.

A member generally designated 20 of the same outline shape and dimensions in plan as member 1 and constructed of non-heat conductive or insulation material is positioned above the member 1 so that all of its outer edges are coextensive and in the same planes as are the corresponding edges of the member 1. The member 20 is secured to the member 1 by means of screws 21 and 22 passing through washers or disk members 23 and 24 which latter uniformly space the member 20 from the member 1. A wooden handle 26 is centrally secured to the member 20 by suitable means as depicted in the drawing for carrying and using the device for its heat securing operation.

The member 20 is also provided with a generally V-shaped notch 28 extending inwardly from the front thereof and positioned centrally in the transverse or lateral direction, which notch is of the same transverse dimensions and symmetrically disposed as that of the member 1 and immediately above and coextensive therewith. The notch 28 is an exact duplicate of notch 2 horizontally and in exact vertical alignment with it in the assembled condition of the device.

The member 20 is also relieved or stepped back along each side of the V-notch at 29 and 30, the unrelieved portions of the member being at the top thereof rather than at the mid and bottom portions as is the case with member 1. The latter reliefs or steps extend rearwardly, join together and continue rearwardly therefrom as a single relief or groove 32 in the underside of the member opening to the outside of the member at the rear thereof at 33. As indicated before, the electric cord 101 enters the device at 8 and 33 and passes along the grooves 7 and 32 on its way to passage within the member 1 at 13.

The generally V-shaped notches 2 and 28 of the device are intended to receive, for heat securement thereof together, a pair of tubular thermoplastic members, the lower one being received in telescopic relation within the upper one and the upper one having an outwardly extending annular flange in continuation of a closed end or top portion forming with the flange upper end limits of the member. These plastic members are shown in phantom lines in FIGURES 2 and 7 in position while being heat secured together and are generally identified by the numerals 35 and 36 with the closed top of the upper members identified by 37 and the flange by 38. These members in their telescoped relation to each other are run into the V-shaped notches, or the device passed over the members so as to accomplish the same thing while the latter are stationary, assuming the lower part 35 to be a fragmentary upper part of a plastic container or bottle which latter is in a filled and therefore weighted condition, until two opposite points or areas 40 and 41 of the plastic members in the region of their mutual telescopic relation make contact with the opposite sides 10 and 11, and 29 and 30 of the non-heat conductive members 1 and 20, whereupon partial and sufficient melting of the plastic by the heating means 100 takes place to effect a fusion of the two members together at these two opposite locations when withdrawn and allowed to cool. Actually, the lower limits 43 of the upper member 36 is adjacent the heating means 100 for this fusion and securement process, thus partially melting small areas of the upper and lower member adjacent each other for their fusion together. This positioning or relation of the plastic members within the notches 2 and 28 of the members 1 and 20 of the device during the fusion process is believed fully apparent from FIGURES 2 and 7.

It is further to be noted and importantly so that because of the V-shape of the notches, the plastic members are wedged or become relatively tight within the notches when run therewithin for better effecting the fusion process and resulting securement of the members together. Further, this V-shaped formation limits, or helps limit the insertative or introductive movement of the plastic members within the dual notches of the members 1 and 20 of the device, whether the plastic members are literally moved into the notches or the device itself moved to accomplish the same thing. This, of course, besides the tightness or positive abutting contact of the members with the members 1 and 20 for a good fusion of the members, is a convenience in carrying out the process; that is, the members are caused to be run in within the notches as far as they will go, held for a short while, and the caused to be withdrawn from the notches, a very simple, quick, and convenient process indeed. The notch formation helps support the upper plastic member in proper coaxial alignment with the lower member 35 during the fusion process so that the members are secured straight on each other, as well as limit the introductive movement of the upper plastic member 36 together with the engagement of the upper member with the sides 10 and 11 of the member 1.

It should be evident that due to the V-shape of the notches 2 and 28 of the members 1 and 20, that is, due to the progressive narrowing or reduction of the space between the side surfaces of the notches in the transverse direction or from side to side therebetween as the space in each of the members extends from the front side of the device inwardly, a substantial latitude in the sizes and also in the shapes of the plastic members desired to be secured together is existent, these members of different sizes or shapes merely contacting the edges of the notches at different locations therealong. If elongated, such as oval, or polygon shaped members are secured together, it may be desired to run the members into the notches a second time after rotating the members 180°, say. Of course, members without flanges can be secured together with the disclosed or similar device, the device merely being run onto the members, partly straddling the same, or the members run into the slots, at a suitable level to effect the securement.

While single upper and lower plastic members 35 and 36 have been disclosed as being securable by the instant device, the lower member, for instance, may be replaced by a plurality of circumferential segments, for instance, placed and secured within the upper member by the fusion process.

While reference has been made to "plastic" members or portions throughout the specifications, it is not desired necessarily to limit the invention to the securement of members of this material only, but rather to members or portions of other material conducive to heat securement together by the present device in various forms.

Recitation in the appended claims such as "when the members or portions are introduced between the heat conductive portions" is intended to also cover moving the device so as to bring "the members or portions" within the space between the "heat conductive portions" of the device.

Any use of terms such as "above," "top," "lower," "front" and the like in the appended claims are relative only to the position of the device shown in the drawing and described in the specification and are not to be construed in an absolute sense inasmuch as, obviously, the device may be held and used in any position for use with members to be heat secured which in any position.

Although but a single preferred embodiment of the invention has been disclosed in detail and certain variations and other embodiments have been briefly mentioned, it is not desired to limit the invention to these inasmuch as still other variations and embodiments can be had and are in fact contemplated. Accordingly, the appended claim should be limited only by its own terms liberally construed in the broad over-all light of the invention.

I claim:

The combination of: a first member formed of a non-heat conducting material having a V-shaped notch extending inwardly from the front thereof, each side of said notch being provided with relieved portions that join together at the rearward portion of said V-shaped notch to form a longitudinally extending groove in the central portion of said first member; a second member formed of an insulating material secured in spaced relation to said first member, said second member having a V-shaped notch complementary with said V-shaped notch in said first member, each side of said V-shaped notch in said second member being provided with relieved portions that join together at the rearward portion thereof to form a longitudinally extending groove in the central portion of said second member, said relieved portions of said V-shaped notch in said first and second members forming a groove on each side of said notch and heating means extending through said longitudinally extending grooves in said first and second members.

References Cited by the Examiner

UNITED STATES PATENTS

| | | | |
|---|---|---|---|
| 1,382,342 | 6/21 | Caneavri. | |
| 1,408,196 | 2/22 | Hoffman | 219—228 |
| 1,420,636 | 6/22 | Macy | 338—231 |
| 2,259,256 | 10/41 | Maas et al. | 219—243 |
| 2,263,152 | 11/41 | Wilcox. | |
| 2,620,430 | 12/52 | Trowbridge | 219—535 |

FOREIGN PATENTS 935,420  11/55  Germany.

EARL M. BERGERT, *Primary Examiner.*

DOUGLAS J. DRUMMOND, *Examiner.*